Figure 1:
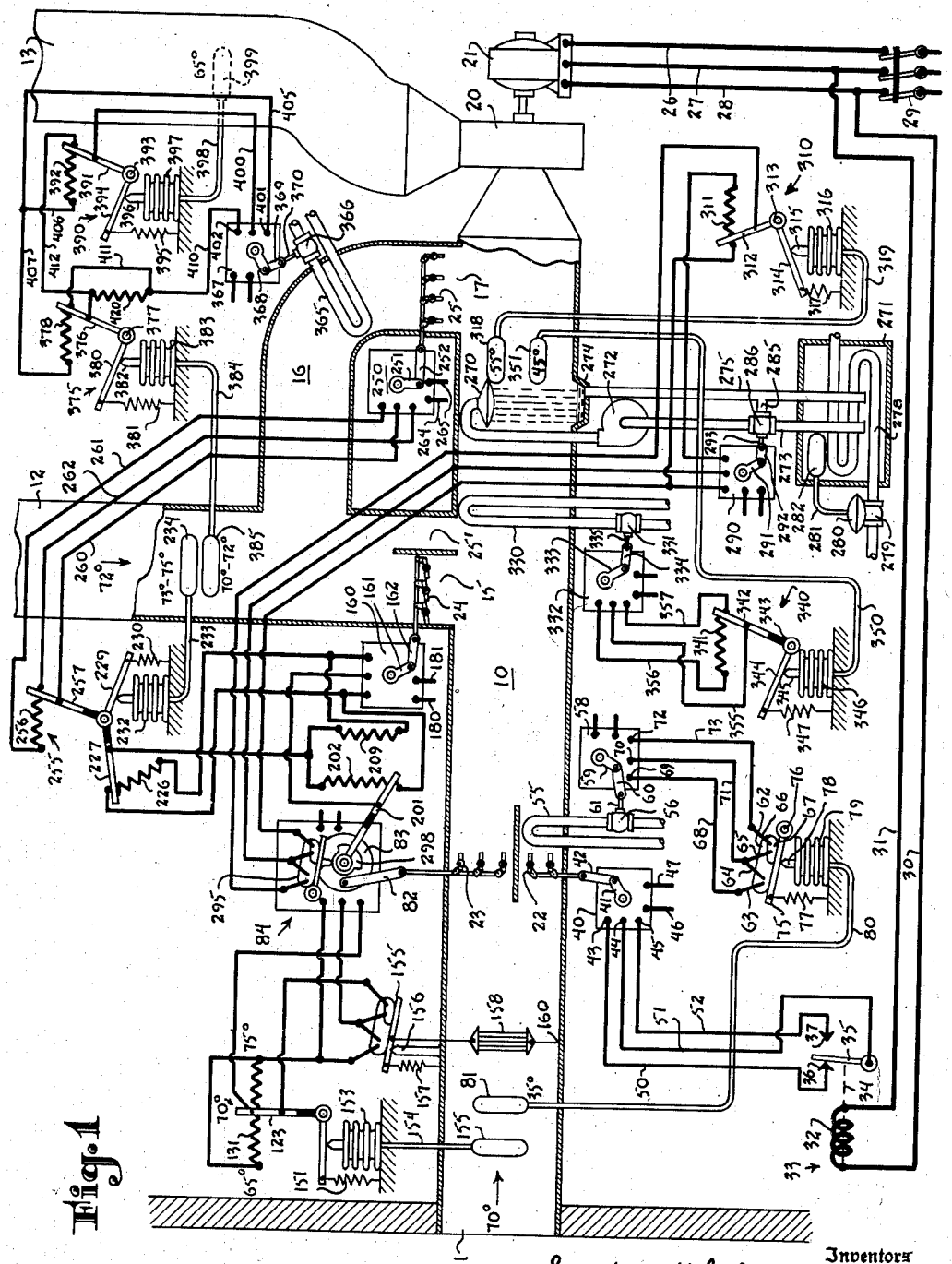

Sept. 30, 1941. G. H. GILDERSLEEVE ET AL 2,257,462

AIR CONDITIONING SYSTEM

Filed April 25, 1938 2 Sheets-Sheet 1

Inventors
Gordon H. Gildersleeve
Ernest Graber
By
George H Fisher
Attorney

Sept. 30, 1941.   G. H. GILDERSLEEVE ET AL   2,257,462
AIR CONDITIONING SYSTEM
Filed April 25, 1938   2 Sheets-Sheet 2

Inventors
Gordon H. Gildersleeve
Ernest Graber
George H. Fisher
Attorney

Patented Sept. 30, 1941

2,257,462

UNITED STATES PATENT OFFICE

2,257,462

AIR CONDITIONING SYSTEM

Gordon H. Gildersleeve, Cranford, N. J., and Ernest Graber, Douglaston, N. Y., assignors to Minneapolis-Honeywell Regulator Company, Minneapolis, Minn., a corporation of Delaware Application April 25, 1938, Serial No. 204,084

16 Claims. (Cl. 257—3)

This invention relates to an air conditioning system and more particularly to a system for providing automatic year around control of the temperature and humidity of the space to be conditioned.

In accordance with my invention an air conditioning chamber having fresh and return air inlets each controlled by dampers is provided. Located in the air conditioning chamber are suitable heating and cooling means and a by-pass for the return air around the heating and cooling means is also provided, this by-pass also being controlled by suitable dampers. A fresh air temperature responsive device controls the fresh and return air dampers to position the fresh air dampers in open position and the return air dampers in closed position whenever the outdoor temperature is at a predetermined value, as for example, 70°. Whenever the outdoor temperature rises above or falls below this value, the fresh air dampers are moved towards closed position and the return air dampers are moved towards open position. A device responsive to the temperature of the return air controls the positions of the return air dampers and the by-pass dampers whenever the fresh air dampers are closed to close the return air damper and open the by-pass damper whenever the return air temperature falls below a predetermined value. A heating coil is located in the by-pass so that when the return air passes through this by-pass, if the return air temperature or the discharge temperature are below certain values the air entering the air conditioning chamber through the by-pass is heated. The heating means in the air conditioning chamber is controlled by a device responsive to the dew-point temperature of the air leaving the cooling means which is in the form of a spray so that as this dew-point temperature falls below a predetermined value, the air passing through is heated by the heating coil. The temperature of the spray is also controlled by a device responsive to the dew-point temperature of the air leaving the spray so that as this dew-point temperature rises above a certain value the temperature of the spray is reduced accordingly. A set of minimum fresh air dampers are provided for permitting some fresh air to be admitted to the air conditioning chamber at all times when the system is in operation, and a preheat coil is provided for heating the fresh air passing through the minimum fresh air dampers, this coil being under the control of a device responsive to the outside temperature so that when this temperature falls below a predetermined value such as 35°, for example, heat will be supplied to this coil. A device responsive to the humidity of the outdoor temperature also controls the fresh air dampers to close the same whenever the outside humidity rises above a predetermined value regardless of the outdoor temperature.

It is accordingly an object of our invention to provide an improved all year around air conditioning system.

More specifically it is an object of our invention to provide an air conditioning system of the type wherein fresh and return air is supplied to an air conditioning chamber to be conditioned, the fresh and return air supplied being suitably controlled so that a maximum amount of fresh air is admitted to the chamber whenever the outdoor temperature is at a desired value, wherein the return air is supplied to the chamber by means of a by-pass around suitable air conditioning means within the chamber whenever the fresh air being supplied to the chamber is at a maximum value, wherein the amount of return air which is by-passed around the heating and cooling elements in the air conditioning chamber is controlled by a return air temperature responsive device whenever the amount of fresh air entering a chamber is less than the maximum value, and wherein the by-pass is provided with a suitable heating element controlled in accordance with the return air temperature and the discharge air temperature.

A further object of the invention is the provision of a novel control means for a set of dampers whose position is selectively controlled by two different conditions or controlled conjointly by the two conditions, depending upon the values of the conditions.

Another object of the invention is the provision of three sets of dampers, one pair of said sets of dampers being simultaneously operated by one condition responsive means, and another pair of said sets of dampers being simultaneously operated by a second condition responsive means.

Another object of the invention is the provision of an air conditioning chamber having fresh and return air inlets, spray means within the chamber, a by-pass for leading return air around the spray means, means for circulating water for the spray means through a cooling chamber, condition responsive means for controlling the flow of air through the fresh and return air inlets and the by-pass, means for by-passing spray water around the cooling means, and condition responsive means in control of the by-passing means.

Figure 2:
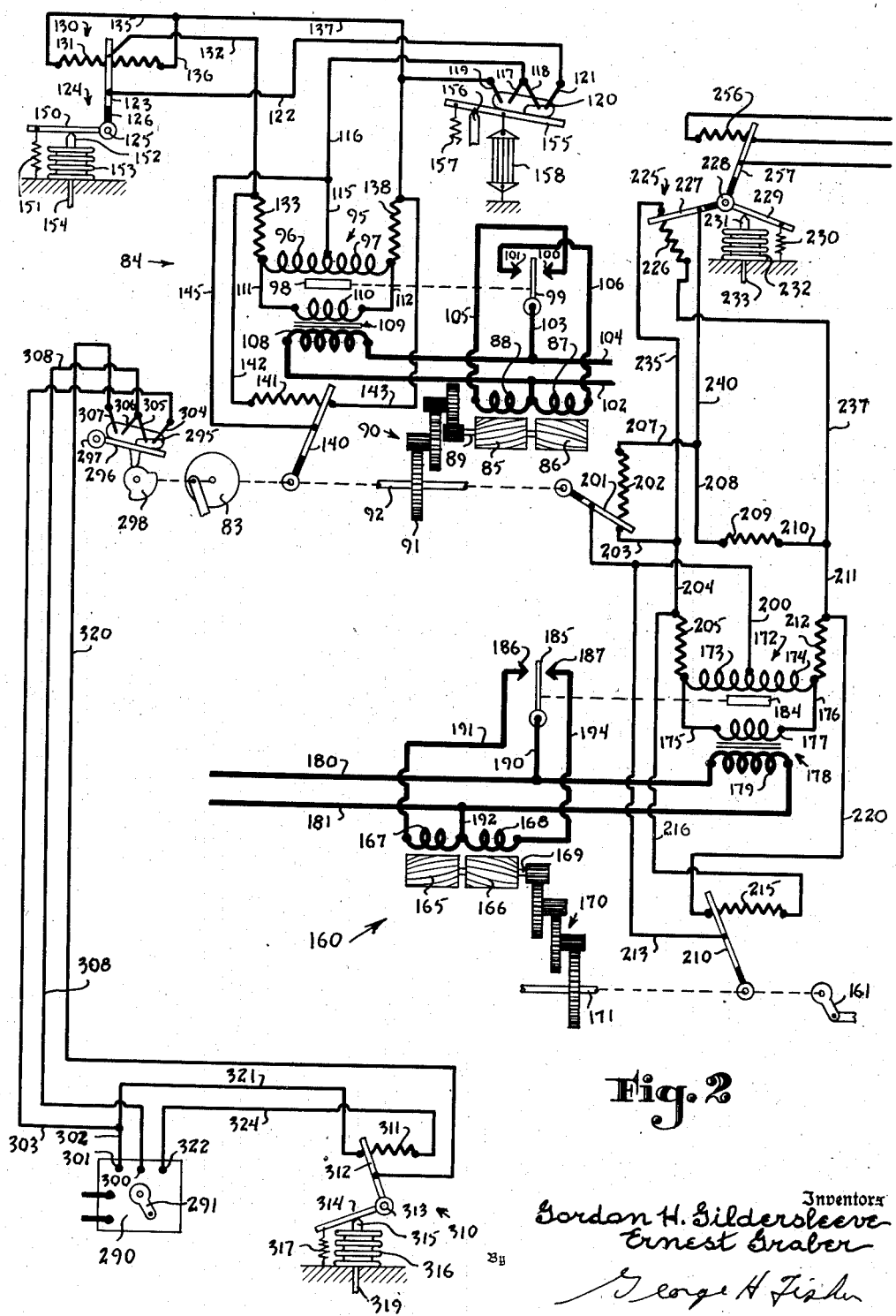

Further objects will become apparent upon a study of the specification and claims in connection with the accompanying drawings, wherein like reference characters represent similar parts in the two views, and wherein Figure 1 is a diagrammatic view of our air conditioning system, and Figure 2 is a diagrammatic view of a portion of the system illustrated in Figure 1, with portions of the apparatus of Figure 1 being shown in greater detail in this figure.

Referring more particularly to Figure 1, an air conditioning chamber is represented generally by the reference character 10. This chamber includes a fresh air inlet 11, a return air duct 12, and a discharge duct 13. A return air inlet 15 for the admission of air entering the chamber 10 through the return air duct 12 is provided. A by-pass 16 connects the return air duct 12 with another inlet 17 positioned downstream from the return air inlet 15. A fan 20 driven by a suitable motor 21 is provided for drawing air through the chamber 10 and discharging it through the duct 13 which leads to a suitable space or spaces to be conditioned.

Two sets of dampers are positioned in the chamber 10 for controlling the admission of fresh air thereto. The first set of dampers 22 may be termed minimum fresh air dampers since they are always open during operation of the system thus permitting the supply of a minimum amount of fresh air at all times as will be more clearly set forth hereinafter. The fresh air dampers 23 are positioned in a manner to be later explained in accordance with the temperature of the outdoor and also in accordance with the humidity of the outdoor air. The return air inlet 15 is controlled by suitable dampers 24, there being a by-pass 25' around these dampers for admitting a minimum supply of return air through the inlet 15 to the chamber 10 at all times. Dampers 25 positioned in the inlet 17 control the flow of air through the by-pass 16 to the air conditioning chamber 10 in a manner to be explained.

Power is supplied to the fan motor 21 through suitable conductors 26, 27, and 28 controlled by a suitable switching means 29 which connects the conductors 26, 27, and 28 to a suitable source of power, not shown. It will be understood that when the switch 29 is in the position illustrated power is supplied to the motor 21 and the fan 20 is operated to draw air through the chamber 10 and discharge the same through the discharge passageway 13. Connected to the conductors 27 and 28 by means of conductors 30 and 31 is a coil 32 of a relay generally designated by the reference character 33. This relay also includes an armature 34, a switch arm 35, and contacts 36 and 37 cooperating with this switch arm. When the relay coil 32 is energized, the arm 35 is moved into engagement with the contact 36, and upon deenergization of this coil the arm 35 moves by gravity or by means of any suitable biasing means, not shown, into engagement with the contact 37.

Relay 33 controls the operation of a motor 40 having an arm 41 rotated thereby and connected by means of a link 42 to the dampers 22 for controlling the position thereof. This motor may be of any suitable construction and may for example consist of a pair of armatures and field windings, one of the field windings being connected between terminals 43 and 44 and the other field winding being connected between terminals 44 and 45. Power may be supplied to the motor 40 by means of conductors 46 and 47 connected to any suitable source of power, not shown. When terminals 43 and 44 are connected together one of the field windings is energized to cause the motor to operate to position the dampers 22 in open position as illustrated. The energization of the other field winding by connecting terminals 44 and 45 together causes the motor to rotate to move the dampers 22 to closed position. It will readily be seen that when the relay 33 is energized, terminals 43 and 44 are connected together through conductors 50, contact 36, arm 35, and conductor 51, and upon deenergization of the relay 33, the arm 35 moves into engagement with contact 37 and terminals 44 and 45 are connected together by means of conductors 51, arm 35, contact 37, and conductor 52. In this manner, whenever switch 29 is closed to cause operation of the fan 20, relay 33 is energized causing dampers 22 to move to open position.

Mounted just ahead of the dampers 22 is a heating coil 55 which may be supplied with any suitable heating medium and controlled by a suitable valve 56. The position of valve 56 is controlled by a motor 58 which may be similar in construction to the motor 40, this motor being provided with an arm 59 connected by means of a link 60 to a valve stem 61. The operation of motor 58 is controlled by a mercury switch 62 having terminals 63, 64, 65, and 66 and a mercury element 67. Terminal 63 is connected by means of a conductor 68 to the terminal 69 of the motor 58, terminal 70 of the motor is connected by means of the conductor 71 to the switch terminals 64 and 65 and terminal 72 of the motor is connected by means of conductor 73 to the switch terminal 66. When terminals 70 and 72 of the motor are connected together the motor operates to move the valve 56 to closed position and upon connecting the terminals 69 and 70 together, the motor operates to open the valve 56.

Switch 62 is mounted upon a lever 75 pivoted at 76 and biased by means of a spring 77 against a pin 78 connected to the top of a bellows 79. The bellows 79 is connected by means of a capillary tube 80 to a bulb 81 mounted in the fresh air inlet 11, the tube, bulb, and bellows being filled with a suitable volatile fluid. When the temperature of the air passing over the bulb 81 drops to a low enough value as for example 35°, the volatile fluid contained within the bulb contracts thus permitting the bellows 79 to contract and the spring 77 to move the switch 62 to the other position in which the terminals 63 and 64 are connected by means of the mercury element 67 whereupon the motor 58 operates to open the valve 56 and supply steam or other suitable heating medium to the coil 55.

The dampers 23 are connected by means of a link 82 to a crank disc 83 which is rotated by means of the motor 84. This motor may be of the type illustrated in Patent 2,028,110 issued to D. G. Taylor on January 14, 1936, and the construction thereof is shown in detail in Figure 2. This motor may consist of a pair of armatures 85 and 86 which are selectively energized by means of field windings 88 and 87, respectively, and cause rotation of the armature shaft 89 in one direction or the other depending upon which of the field windings is energized. The armature shaft 89 may be connected by means of suitable reduction gearing 90 to a gear 91 mounted on a shaft 92 carrying the crank disc 83. The selective energization of field windings 87 and 88 is controlled by means of a relay 95, this relay including opposed balanced windings 96 and 97, an armature 98, and an arm 99 cooperating with contacts 100 and 101. When windings 96 and 97 are equally energized, the armature 98 moves to the mid-position as illustrated wherein arm 99 is in engagement with neither contact 100 nor 101. The energization of winding 96 to a greater extent than the winding 97 causes the arm 99 to move into engagement with contact 101 and the energization of winding 97 to a greater extent than winding 96 causes the arm 99 to move into engagement with contact 100. The junction of the field windings 87 and 88 is connected to a line wire 102 and the arm 99 is connected by means of a conductor 103 to line wire 104. Line wires 102 and 104 may be connected to a suitable source of power, not shown. When the arm 99 is in engagement with contact 101 the winding 87 is energized by means of the following circuit: from the line 104 to conductor 103, arm 99, contact 101, conductor 106 through the winding 87 and to the line 102. The armature 86 is accordingly energized and rotates in a direction to cause the fresh air dampers to move towards closed position. When the arm 99 is in engagement with the contact 100 the field winding 88 is energized by the following circuit: from the line 104 through conductor 103, arm 99, contact 100, conductor 105, winding 88 back to the line 102. Armature 85 is now rotated to cause rotation of shaft 92 and crank disc 83 carried thereby to rotate in the direction to move the dampers 23 towards open position. Connected to the lines 102 and 104 is the primary 108 of a step-down transformer 109. The secondary 110 of this transformer is connected by means of conductors 111 and 112 to the opposite ends of the windings 96 and 97 of the relay 95. The junction of these coils is connected by means of conductors 115 and 116 to the terminals 117 and 118 of a mercury switch 120. The terminal 121 of this switch is connected by means of a conductor 122 to an arm 123 of the bell crank lever 124 which is pivoted at 125, the upper portion of this arm being suitably insulated from the rest of this lever by means of insulation 126. This arm 123 forms the movable arm of a potentiometer 130 having a resistance element 131 the center portion of which is connected by means of a conductor 132 to the end of relay coil 96 through a protective resistance element 133. The opposite ends of the resistance 131 are connected together by means of conductors 135 and 136 and are connected to the end of relay coil 97 by means of conductor 137 and protective resistance 138. It will be noted that when the switch 120 and the arm 123 of potentiometer 130 are in the positions illustrated, that the relay coil 97 is more highly energized than the relay coil 96 since the only resistance in series with the coil 97 is the resistance 133 and accordingly arm 99 moves into engagement with the contact 100 and field winding 88 is energized to cause rotation of shaft 92 in a direction to move the fresh air dampers 23 towards open position. Also mounted on the shaft 92 rotated by the armature shaft 89 is an arm 140 suitably insulated therefrom and cooperating with a resistance 141, this arm and resistance forming a balancing potentiometer for the motor 84. The left end of resistance 141 is connected by means of conductor 142 and resistance 133 to the left end of relay coil 96 and the opposite end of resistance 141 is connected by means of conductor 143 and resistance 138 to the extremity of relay coil 97. The arm 140 is connected by means of conductors 145 and 115 to the junction of the relay coils 96 and 97. When the arm 140 is in the position illustrated at the right end of resistance 141, the effect of potentiometer 130 is balanced out and the coils 96 and 97 are equally energized and the arm 99 is therefore in mid position between the contacts 100 and 101. Movement of arm 123 to either the right or the left from the position illustrated, when the arm 140 is in the position illustrated, will cause the coil 96 of relay 95 to become more highly energized than the coil 97 whereupon the arm 99 will be moved into engagement with contact 101 and field coil 87 will cause rotation of armature 86 and shaft 92 in a direction to move the fresh air dampers towards closed position. The armature 86 will continue to rotate until the arm 140 has moved sufficiently far toward the left of resistance 141 to balance the effect of the movement of the arm 123 over resistance 131. In this manner the motor rotates in a direction to close the fresh air dampers whenever the arm 123 deviates from the center position, an amount proportional to the amount of the deviation of the arm 123.

The bell crank lever 124 which includes the arm 123 also includes an arm 150 biased by means of a spring 151 into engagement with a pin or plunger 152 extending upwardly from the top of a bellows 153. This bellows is connected by means of a capillary tube 154 to a bulb 155' mounted in the fresh air inlet 11, the tube, bulb, and bellows being filled with a suitable volatile fluid which expands or contracts in response to temperature changes. This bulb and bellows is so arranged that when the fresh air temperature is at a predetermined value as for example 70°, the arm 123 will be in the mid position illustrated with respect to the resistance 131. As the outdoor temperature falls, the fluid within the bulb 155' contracts and the arm 123 moves toward the left over resistance 131. Upon an increase in outdoor temperature the arm 123 will be moved towards the right as will be readily apparent. It will therefore be seen that when the temperature of the fresh air is at a predetermined value as for example 70°, the arm 123 is in the mid position over the potentiometer resistance 131 and the motor 84 has rotated to a position such that the fresh air dampers 23 are wide open. As the fresh air temperature increases or decreases the motor rotates in a direction to move the dampers 23 towards closed position, the extent of movement of the dampers being proportional to the change in the outdoor temperature above or below 70°. It will be obvious that when the arm 123 reaches either end of resistance 131, that the arm 140 of the balancing potentiometer will have to move to the extreme left end of resistance 141 in order to balance the effect of the control potentiometer 130 and when the arm 140 is in this position the motor will have rotated sufficiently to move the dampers 23 to their fully closed position. The range of temperatures through which the arm 123 moves may be chosen as desired and may be for example the extreme left end of resistance 131, at 75° the arm will have moved to the extreme right end of the resistance and the arm 123 will be in the 65° to 75°. Thus at 65°, the arm 123 will be at mid position with the outdoor temperature at 70°.

The mercury switch 120 is carried by a lever 155 pivoted at 156 and biased in a counter-clockwise direction by means of a spring 157. Connected to the right of the pivot 156 is a suitable humidity responsive element 158 mounted within the fresh air inlet 11, the opposite end of this element being suitably fixed as at 160. This humidity responsive element may be formed of any suitable material that expands in accordance with a rise in humidity and contracts upon a decrease in humidity. If the element 158 expands sufficiently due to a rise in humidity of the air entering the air conditioning chamber, the arm 155 will pivot to such a position under the influence of the biasing means 157 that the contacts 117 and 119 of the switch 120 are connected together by the mercury element. When this happens the coil 96 will be more highly energized than the coil 97 since the only resistance in series with the coil 96 will be the resistance 138 and the arm 99 of the relay 95 will accordingly be moved into engagement with the contact 101 and armature 86 will rotate and cause the dampers 23 to move towards closed position. This rotation of the motor will continue until the dampers are fully closed since the effect of switch 120 will not be balanced until the arm 140 has moved to the extreme left end of resistance 141. It will thus be seen that when the humidity of the air entering the chamber 10 is at a sufficiently high value, the fresh air dampers 23 will be completely closed regardless of the temperature of the air entering the chamber.

The position of the dampers 24 is controlled by a motor 160. An arm 161 driven by this motor is connected by means of a link 162 to the dampers. This motor may be similar in construction to motor 84 and includes a pair of armatures 165 and 166 operated by means of field windings 167 and 168, respectively. The armatures are mounted on a shaft 169 connected by means of a reduction gearing 170 to a shaft 171 carrying the arm 161. A relay 172 similar to the relay 95 of the motor 84 is provided. This relay includes opposed balanced coils 173 and 174 connected together at one end and connected by means of conductors 175 and 176 to secondary 177 of a step-down transformer 178. The primary 179 of this transformer is connected to line wires 180 and 181 which are connected to a suitable source of power, not shown. Relay 172 also includes an armature 184 influenced by the coils 173 and 174 and connected to an arm 185 cooperating with fixed contacts 186 and 187. When the coil 173 is more highly energized than the coil 174, the arm 185 is moved into engagement with contact 186 and the field winding 167 of the motor 160 is energized through the following circuit: from the line 180 through conductor 190, arm 185, contact 186, conductor 191, winding 167, and conductor 192 to the line wire 181. The motor 160 is now rotated in a direction to move the return air dampers towards open position. When the winding 174 becomes more highly energized than the winding 173 the armature 184 is moved to the right and moves the arm 185 into engagement with the contact 187. Field winding 168 is now energized by means of the following circuit: from the line wire 180 to conductor 190, arm 185, contact 187, conductor 194, winding 168, and conductor 192 to the line wire 181. The energization of winding 168 causes the motor to rotate in a direction to move the dampers towards open position. When field windings 173 and 174 are equally energized or balanced against one another, the armature 184 moves to the mid position illustrated in which arm 185 engages neither contact 186 nor 187, neither field winding is energized and the motor is at rest.

Connected to the junction of the coils 173 and 174 by means of a conductor 200 is an arm 201 connected to and insulated from the shaft 92 driven by the motor 84. The arm 201 is arranged to move across a resistance 202 when the motor 84 is in operation. The lower end of resistance 202 is connected by means of conductors 203, 204, and a protective resistance 205 to the left end of the coil 173. The opposite end of the resistance 202 is connected by means of conductors 207, 208, a resistance 209, conductors 210, 211, and a protective resistance 212 to the right end of the coil 174. When the arm 201 is at the lower extremity of resistance 202 it will be apparent that the coil 174 is more highly energized than the coil 173 and the armature 166 is accordingly energized to cause the motor to rotate in a direction to move the dampers 24 towards closed position.

Carried by the shaft 171 and insulated therefrom is the arm 210 of a balancing potentiometer resistance 215. This arm is moved by the motor 160 in an opposite sense from the arm 201 of the motor 84 whereby the effect of the arm 201 is balanced by the arm 210. The arm 210 is connected by means of conductors 213 and 200 to the junction of the coils 172 and 173. The right end of the resistance 215 is connected by means of conductors 216 and resistance 205 to the left end of the coil 173. The opposite end of the resistance 215 is connected by means of a conductor 220 and resistance 212 to the right end of the coil 174. When the arm 201 is at the lower extremity of resistance 202 as illustrated the motor 160 will rotate until the arm 210 is at the left end of resistance 215, as illustrated, whereby the effect of potentiometer resistance 202 is counter-acted and the relay coils 173 and 174 are equally energized, the armature 184 is in the mid position and the motor 160 is at rest. It will therefore be apparent that as long as the fresh air dampers are in their wide open position and arm 201 is in the position illustrated, the return air dampers 24 will be in their fully closed position so that the only air entering the chamber 10 through the return air inlet 15 will be through the small by-pass 25'. As the fresh air dampers begin to move towards closed position in response to the outside air temperature rising above or falling below 70° the arm 201 is moved by the shaft 92 upwardly over the resistance 202 an amount proportional to the extent of movement of the dampers 23. As the arm 201 moves upwardly over the resistance 202 the coil 173 becomes more highly energized than the coil 174 and the arm 185 moves into engagement with the contact 186 whereupon the armature 165 of the motor 160 is driven to move the return air dampers towards open position. At the same time the arm 210 of the balancing potentiometer is moved towards the right of the resistance 215 and the motor 160 will continue to rotate until the effect of the potentiometer 202 on the relay 172 is balanced by the movement of the arm 210 over the resistance 215. Accordingly it will be seen that dampers 24 will move an amount proportional to the movement of dampers 23 in an opposite direction. In other words as dampers 23 move towards closed position, the dampers 24 are moved towards open position.

A second potentiometer 225 also exercises a control over the motor 160 at certain times. This potentiometer includes a resistance 226 and an arm 227 arranged to sweep thereover, this arm being pivoted at 228 and forming part of a lever including arm 229. The arm 229 is biased downwardly by means of a spring 230 into engagement with a pin or plunger 231 extending upwardly from a bellows 232. Bellows 232 is connected by means of a capillary tube 233 to a bulb 234 mounted in the return air duct 12. The tube, bulb, and bellows may be filled with a suitable volatile fluid which expands or contracts in accordance with changes in the return air temperature. As the return air temperature increases the bellows 232 expands and the arm 227 is moved downwardly over the resistance 226. The arrangement may be such that arm 227 is at the upper extremity of resistance 226 when the return air temperature is below 73° F. and upon a rise in return air temperature to 75° the arm 227 may be moved to the lower extremity of the resistance 226. The upper portion of resistance 226 may be connected by means of conductors 235 and 204 and resistance 205 to the left end of relay coil 173. The opposite end of resistance 226 may be connected by means of conductor 237, conductor 211, and resistance 212 to the right end of relay coil 174. The arm 227 of the potentiometer 225 is connected by means of conductors 240 and 207 to the upper end of resistance 202. When the arm 201 is in the lower position illustrated the relay coil 173 will be shorted out except for the resistance 205 and the potentiometer 225 will have no effect on the relay 172. Therefore regardless of the return air temperature, the return air dampers will always be in their fully closed position whenever the fresh air dampers are in their wide open position. However as the fresh air dampers start to move towards closed position by reason of the outdoor temperature rising above or falling below 70° and the arm 201 moves upwardly over the resistance 202 both the potentiometers 202 and 225 will act to control the motor 160, and the position of the return air dampers. When the fresh air dampers are fully closed the arm 201 is at the upper extremity of resistance 202 and it is intended at this time that the control of the return air damper should be by the potentiometer 225. In order that potentiometer arm 201 exercises no control over the damper motor 160 when in its upper extreme position, the resistance 209 which is of the same resistance value as resistance 202 is positioned between the upper end of the resistance 202 and the right end of relay coil 174 so that the effect of the resistance 202 is nullified. It will be noted that when the arm 227 is at the upper extremity of resistance 226 and the arm 201 is at the upper extremity of resistance 202 then coil 174 is more highly energized than coil 173 whereupon arm 185 is moved into engagement with contact 187 and the motor rotates in a direction to close the return air dampers 24. If the return air temperature rises above the lower limit of potentiometer 225, or in other words, rises above 73°, the arm 227 begins to move downwardly over resistance 226 and the resistance in series with coil 173 begins to decrease whereas the resistance in series with coil 174 increases. Arm 185 now moves into engagement with contact 186 thus energizing the field winding 167 whereupon shaft 171 rotates in a direction to open the return air dampers an amount proportional to the rise in the return air temperature. After the effect of potentiometer 225 has been balanced by the balancing potentiometer 215 the motor will come to rest. It will be understood of course, that if the fresh air dampers are only partly closed and arm 201 is intermediate the ends of resistance 202 that the position of the motor 160 will be controlled by the combined effects of potentiometers 202 and 225.

It will now be understood that whenever the fresh air damper is wide open, the return air damper will be fully closed regardless of the return air temperature, also when the fresh air dampers are closed and the return air temperature is above 75° the return air dampers will be fully opened, but whenever the fresh air dampers are fully closed and the return air temperature is below 75° the return air dampers will be moved towards closed position depending upon how far below 75° the return air temperature is. In other words, when the outdoor temperature is at 70° the fresh air dampers are opened and the return air dampers are closed but whenever the fresh air temperature rises above or drops below 70° the fresh air dampers start to close and the return air dampers start to open assuming the return air temperature is sufficiently high, but if the return air temperature is below the 75° limit the return air dampers are moved in accordance with the return air temperature and the fresh air temperature.

The position of the by-pass dampers 25 is controlled by a motor 250 which may be similar in construction to the motors 84 and 160. Since the construction of these motors has been clearly set forth, illustration of the internal wiring of this motor is not deemed necessary. Arm 251 is operated by this motor and is connected by means of link 252 to the dampers 25. Motor 250 is controlled by potentiometer 255 which includes a resistance 256 and arm 257. This arm is rigid with the arms 227 and 229 and rotates therewith as is apparent in the drawing. A conductor 260 connects the arm 257 with the junction of the relay coils of the balancing relay within the motor. Conductor 261 connects the left ends of resistance 256 with the extremity of one of these relay coils and conductor 262 connects the right end of resistance 256 with the extremity of the other relay coil. Conductors 264 and 265 which may be connected to a suitable source of power are provided for supplying power to the motor.

When the arm 257 of potentiometer 255 is in the extreme right position illustrated the motor 250 is operated to position the dampers 25 in their maximum open position. The arm 257 will be in this position whenever the return air temperature is below 73°. Upon a rise in return air temperature the arm 257 moves towards the left and the motor 250 is operated to move the dampers 25 towards closed position. When the return air temperature reaches 75°, the arm 257 is moved to its extreme left position and the dampers 25 are moved to their fully closed position. In this position it will be understood that the arm 227 is at the lower extremity of the resistance 226 and the return air dampers 24 are positioned in accordance with the position of the fresh air dampers 23 as heretofore explained. It will now be seen that the fresh and return air dampers 23 and 24 are positioned in accordance with the fresh air temperature and the return air dampers 24 are also controlled by the return air temperature as are the by-pass dampers 25.

For the purpose of cooling and washing the air, a spray 270 is positioned in the chamber 10 and is supplied with water from a tank 271. A pump 272 is provided for supplying water to the spray 270 from the tank 271 by means of a pipe 273. A sump 274 is provided in the bottom of the chamber 10 below the spray 270 and a pipe 275 connects this sump with the tank 271 so that the water is continuously recirculated. The water in the tank 271 is maintained at a fixed predetermined temperature. For this purpose a cooling coil 278 is provided in the tank and a cooling medium is circulated through this coil and controlled by means of a suitable valve 279. This valve may be automatically controlled in accordance with the temperature of the water in the chamber and for this purpose is provided with a suitable operating bellows or diaphragm mechanism 280 connected by means of a capillary tube 281 to a bulb 282 positioned within the tank 271. The tube and bulb may be filled with a suitable volatile fluid which exerts a force on the mechanism 280 in accordance with the temperature of the water within the tank 271 so that as the temperature of the water in the tank increases the valve is automatically opened to admit more cooling fluid to the coil 278 whereby a predetermined temperature may be maintained within the tank. Any suitable means, (not shown), may be provided for maintaining a fixed supply of water in the tank 271.

A suitable by-pass 285 connects the pipe 275 and the pipe 273 above the tank 271, the flow through this by-pass being controlled by means of a suitable three-way valve 286. When this valve is in one extreme position all the water circulated by the pump 272 must flow through the cooling tank 271 and when the valve is in the other extreme position, all the water circulated by the pump is by-passed around the tank 271. As the valve moves between its extreme positions varying proportions of water are circulated through the tank and by-passed around the tank so that the temperature of the water issuing from the spray 270 is effectively controlled.

A motor 290 which may be similar in construction with the motors 84 and 160 is provided for controlling the position of the valve 286, an arm 291 being rotated by the motor and being connected by means of a link 292 with the valve stem 293. It is desired when the fresh air dampers 23 are in wide open position, indicating that the outdoor air is at the proper temperature and cooling thereof is unnecessary, that the valve 286 be in the extreme position wherein all the water circulated by the pump 272 is by-passed around the tank 271. For this purpose a mercury switch 295 is carried by a lever 296 pivoted at 297 and positioned by means of a cam 298 operated by the shaft 92 which is rotated by the motor 84. Whenever the fresh air dampers are open, the lever 296 rests upon a low portion of the cam 298 and the switch 295 is in the position illustrated. In this position the relay coil connected between terminals 300 and 301 (Figure 2) is shorted out by the mercury switch 295 as follows: from the terminal 301 through conductors 302, 303, terminal 304 of the switch 295 through the mercury element to the terminal 305 and conductor 308 to the terminal 300. With these terminals shorted out, the motor rotates to a position wherein the valve 286 is in the completely by-passed position and the tank 271 effects no cooling of the water being supplied in the chamber 10. When the dampers 23 are moved to their closed position, the cam 298 is rotated by the shaft 92 to a position wherein the switch 295 is tilted to its opposite position and terminals 306 and 307 are connected together by the mercury element within the switch. The motor 290 is now controlled by a controller generally designated by the reference character 310, this controller comprising a potentiometer resistance 311 and a potentiometer arm 312 which forms one arm of a bell crank lever pivoted at 313. The other arm 314 of this lever rests against a pin or plunger 315 connected to the upper portion of a bellows 316. A spring 317 biases the arm 314 downwardly against the pin or plunger 315. A capillary tube 319 is connected to the bellows 316 and terminates in a bulb 318. This bulb, tube, and bellows may be filled with a suitable volatile fluid whereupon the arm 312 is positioned in accordance with the temperature of the fluid within the bulb 318. This bulb is positioned immediately downstream of the spray 270 so that it responds to the dew-point temperature of the air leaving the spray.

When the switch 295 is tilted in the opposite direction in response to a closure of the fresh air dampers 23, the junction of the relay coils within the motor 290 is connected by means of conductors 308, terminals 306 and 307 of the switch 295 and conductor 320 to the arm 312 of potentiometer 311. The terminal 301 of the motor 290 is connected by means of conductors 302 and 321 to the left end of the resistance 311. The terminal 322 which connects to the extremity of the other relay coil within the motor 290 from that which is connected to terminal 301 is connected by means of conductor 324 to the right end of resistance 311. It will accordingly be seen that when the mercury switch 295 is tilted in the position opposite to that illustrated that the motor 290 will be controlled solely by the controller 310. If the dew-point temperature of the air leaving the spray 270 rises above a predetermined value, as for example 55°, the valve 286 will be operated by the motor 290 to by-pass less of the water around the tank 271 and circulate more of the water through the tank thus maintaining a minimum dew-point temperature of the air leaving the spray of 55°.

Mounted upstream from the spray 270 is a heating coil 330 through which any suitable heating medium such as steam may be circulated. A valve 331 controls the flow of heating medium through the coil 330 and a motor 332 similar to the motors 84 and 160 may be provided for controlling the position of this valve. An arm 333 is operated by the motor 332 and is connected by means of a link 334 to valve stem 335. A controller 340 is provided for controlling the operation of motor 332. This controller may comprise a potentiometer resistance 341 with which cooperates an arm 342 forming one arm of a bell crank lever pivoted at 343, the other arm 344 of the lever cooperating with the pin 345 of the bellows 346. A spring 347 biases the lever 344 against the pin 345. Bellows 346 is connected by means of a capillary tube 350 with a bulb 351 mounted just downstream from the spray 270. This bellows, tube, and bulb may be filled with a suitable volatile fluid and since the bulb 351 is mounted just downstream from the spray 270 the controller 340 will respond to the dewpoint temperature of the air leaving the spray 270.

A conductor 355 connects the arm 342 with the junction of the relay coils within the motor 332, the opposite ends of these coils being connected by means of conductors 356 and 357 with the opposite ends of the resistance 341. When the dew-point temperature of the air leaving the spray 270 is above a predetermined value such as 45°, the arm 342 will be positioned at the right end of resistance 341, as illustrated, and the motor will position the valve 331 in fully closed position. If the dew-point temperature of the air leaving the spray 270 drops below 45°, the arm 342 begins to move towards the left whereupon the motor 332 begins to open the valve 331, thus permitting the supply of a heating medium to the coil 330 in accordance with the dew-point temperature for maintaining this temperature at 45°. It will be understood of course that whenever the valve 331 is open to admit the heating medium to the coil 330, the dew-point temperature of the air leaving the spray will be so low that the valve 286 will be in the completely by-passed position so that the water issuing from the spray 270 is not being cooled.

Located within the by-pass 16 is a heating coil designated by the reference character 365 controlled by a valve 366. A motor 367 similar to motors 84 and 160 is provided for controlling the position of the valve 366. An arm 368 is operated by the motor 367 and is connected by means of a link 369 with a valve stem 370. The motor 367 is controlled in accordance with the return air temperature and also the discharge air temperature. A control 375 responsive to the return air temperature includes an arm 376 pivoted at 377 and arranged to move over a potentiometer resistance 378. Arm 380 rigid with arm 376 is biased by means of spring 381 into engagement with pin or plunger 382 connected to bellows 383. This bellows is connected by means of a capillary tube 384 to a bulb 385 mounted in the return air duct 12, the tube, bulb, and bellows being filled with a suitable volatile fluid so that arm 376 is positioned in accordance with the return air temperature. Controller 390 responds to the discharge air temperature and includes arm 391 cooperating with resistance 392, the arm being pivoted at 393 and having an arm 394 rigid therewith and biased by spring 395 into engagement with pin or plunger 396 connected to bellows 397. This bellows is connected by means of a capillary tube 398 to a bulb 399 positioned in the discharge duct 13. The tube, bulb, and bellows are filled with a suitable volatile fluid and it will be readily apparent that arm 391 will be positioned in accordance with the discharge air temperature. The controller 390 is intended to function as a low limit controller to cause the opening of valve 366 whenever the air being discharged through the duct 13 falls below a predetermined value such as 65°. It will therefore be seen that normally the arm 391 will be positioned at the extreme right end of the resistance 392 except when the discharge air temperature falls below this predetermined value. The main control over the motor 367 is by the controller 375 which responds to the return air temperature. This may be so arranged as to control the motor between the temperatures of 70° and 72°. Thus whenever the return air temperature is above 72° the arm 376 will be at the right end of resistance 378. If the return air temperature falls below this value the arm 376 will begin to move towards the left and whenever the return air temperature drops to 70°, for example, the arm 376 will be positioned at the opposite end of resistance 378.

The junction of the relay coils of motor 367 is connected by means of conductor 400 to the arm 391. The terminal 401 of the motor connects to the extremity of one of the relay coils and this terminal is connected by means of conductors 405 and 406 to the left end of resistance 392 and by means of conductors 405 and 407 to the left end of resistance 378. The terminal 402 of the motor is connected to the extremity of the other relay coil and this terminal is connected by means of conductors 410 and 411 to the right end of the resistance 378. Arm 376 of the controller 375 is connected by means of conductor 412 to the right end of resistance 392. When the controllers 375 and 390 are in the positions illustrated, relay coil connected to terminal 402 of the motor is shorted out through the following circuit: through conductor 400, arm 391, conductor 412, arm 376, and conductors 411 and 410 to the terminal 402. With this relay coil shorted out the motor 367 operates to completely close the valve 366 so that no heat is supplied to the coil 365. If the temperature of the return air now drops below 72° the arm 376 begins to move towards the left and increase the resistance in shunt with the coil connected to the terminal 402 at the same time decreasing resistance in series with the other relay coil. The motor 367 now operates to open the valve an amount proportional to the movement of arm 376 over the resistance 378 and it will be seen that when arm 376 is at the opposite extremity of resistance 378 the motor will operate to completely open the valve 366 whereby maximum heat is being supplied to the air by the coil 365. The temperature at which this takes place may be at 70° for example. It is intended that during this time the resistance 392 of controller 390 should have no effect on the motor 367 since the discharge air temperature is above 65°. The resistance 392 is connected between the center motor terminal and the terminal 401 through the arm 391. Accordingly a second resistance 420 having a resistance value equal to that of resistance 392 is connected by means of the arm 391 between the center motor terminal and the terminal 402 whereby the effect of resistance 392 is balanced out by the resistance 420 when the arm 391 is in the extreme right position.

Assuming now that the return air temperature is at 72°, or higher, the arm 376 will be in the position shown calling for closing of the valve 366. If now the discharge air temperature should fall below 65°, the arm 391 will move towards the left over resistance 392 thus adding resistance in the circuit in shunt with the coil between the center terminal and terminal 402 whereupon the motor moves the valve towards open position an amount depending upon the movement of arm 391 to the left. It will therefore be seen that the valve is controlled primarily in accordance with return air temperatures but in case the discharge air temperature falls below a desired value, the valve is opened regardless of the return air temperature. This condition is more likely to exist during the cooling season and it is undesirable that air be supplied to the space below a certain temperature as at 65° to prevent the existence of a cold draft within the space being conditioned.

It is believed that the operation of the system will now be apparent but it may be briefly summarized as follows: the fresh air dampers 23 will be open whenever the outside temperature is at a desired value providing that the humidity of the outside air is not excessive. As the outside air temperature increases or decreases above or below this desired value which may be chosen as 70°, the fresh air dampers move towards closed position and above 75° or below 65° the fresh air dampers will be entirely closed. Regardless of the outside air temperature, whenever the humidity of the outside air reaches an excessive value the fresh air dampers will also be closed. The minimum fresh air dampers 22 are however open at all times during operation of the system and the air passing through these dampers is preheated whenever the outdoor temperature falls below a certain value such as 35°.

The dampers 24 in the return air inlet are closed whenever the fresh air dampers are wide open. Whenever the fresh air dampers start to move towards closed position the return air dampers 24 begin to move toward open position if the return air temperature is sufficiently high. If however, the return air temperature falls below a desired value such as 75°, the return air dampers 24 will tend to move towards closed position, the dampers 24 being operated conjointly in accordance with the position of the fresh air dampers and the return air temperature. The dampers 25 are controlled in accordance with the return air temperature and are entirely open whenever the return air temperature is below a predetermined value such as 73°. Whenever the return air temperature reaches a value of say 75°, these dampers become completely closed. Thus, the fresh air dampers are operated in accordance with fresh air temperature, the return air dampers are operated in accordance with fresh and return air temperatures, and the by-pass dampers are controlled in accordance with return air temperature.

The temperature of the cooling and washing spray 270 is controlled in accordance with the position of the fresh air dampers and in accordance with the dewpoint temperature of the air passing through the spray. As long as the fresh air dampers 23 are open, the water circulated through the spray 270 is not cooled whatever, but whenever the fresh air dampers are completely closed the temperature of the spray is controlled in accordance with the dewpoint temperature of the air passing therethrough so that this dewpoint temperature is kept below a maximum value of 55°, for example. The heating coil 330 is also controlled in accordance with the dewpoint temperature of the air leaving the spray to maintain a minimum dewpoint temperature of 45°, for example. Thus, whenever this dewpoint temperature drops below 45°, heat is supplied to the air passing through the spray by means of the coil 330 but should the dewpoint temperature rise above 55° the heating coil 330 will of course be inoperative and the water circulated by the spray will be cooled in accordance with the dewpoint temperature to keep it down to 55°.

The heating coil 365 is controlled primarily by the return air temperature so that should this temperature drop below 72° heat will be supplied by the coil 365, the amount of heat being at a maximum when the temperature of the return air is down to 70° for example. It will be understood of course that when the temperature of the return air is down to 72° the return air dampers 24 will be closed and the by-pass dampers 25 will be open so that heat is supplied to the air by means of the coil 365. The coil 365 will also provide heat whenever the discharge temperature is below 65° regardless of the return air temperature, thus preventing the existence of a cold draft within the space being conditioned.

It will now be seen that I have devised a very complete air conditioning system whereby automatic year around control is provided and whereby the system is operated most economically at all times. Thus, when the outdoor temperature is at a desired value and no heating or cooling thereof is necessary the fresh air dampers are open thus admitting a maximum amount of fresh air and the temperature of the wash water will be substantially the same as the fresh air so that no cooling thereof is necessary.

It should be understood that the various temperature values referred to throughout the specification are illustrative only, and that any suitable temperature values may be chosen in actual practice.

Having described the preferred form of our invention, many modifications will become apparent to those skilled in the art and we wish it to be understood that this invention is limited only by the scope of the appended claims.

We claim as our invention:

1. In an air conditioning system, an air conditioning chamber having a fresh air inlet, a return air inlet, conditioning means within said chamber for changing the heat content of air flowing therethrough, means for conducting air from a space being conditioned to said return air inlet, a by-pass for conducting air from said conducting means around said conditioning means to said conditioning chamber, means for circulating air through said air conditioning chamber and a space to be conditioned, damper means in control of said fresh air inlet, said return air inlet and said by-pass, means influenced by a first condition varying with the heat content of the fresh air in control of the damper means controlling said fresh air inlet and said return air inlet, means influenced by the heat content of the return air also in control of the damper means controlling said return air inlet and the damper means in control of said by-pass, and means influenced by a second condition varying with the heat content of the fresh air also in control of the damper means controlling the fresh air inlet and the return air inlet.

2. In an air conditioning system, an air conditioning chamber having a fresh air inlet, a return air inlet, conditioning means within said chamber for changing the heat content of the fresh air, means for conducting air from a space being conditioned to said return air inlet, a by-pass for conducting air from said conducting means around said conditioning means to said conditioning chamber, means for circulating air through said air conditioning chamber and a space to be conditioned, damper means in control of said fresh air inlet, said return air inlet and said by-pass, means influenced by a first condition varying with the heat content of the fresh air in control of the damper means controlling said fresh air inlet and said return air inlet, means responsive to the heat content of the return air also in control of the damper means controlling said return air inlet and the damper means in control of said by-pass, means under the control of the first mentioned condition responsive means for controlling the conditioning, effect of the conditioning means, and means influenced by a second condition varying with the heat content of the fresh air also in control of the damper means controlling the fresh air inlet and the return air inlet.

3. In an air conditioning system, an air conditioning chamber having a fresh air inlet, a return air inlet, cooling means within said chamber, means for conducting air from a space being conditioned to said return air inlet, a by-pass for conducting air from said conducting means around said cooling means to said conditioning chamber, means for circulating air through said air conditioning chamber and a space to be conditioned, damper means in control of said fresh air inlet, said return air inlet and said by-pass, means responsive to the temperature of the fresh air for controlling the damper means in control of the fresh air inlet and the return air inlet to provide for admission of a maximum amount of fresh air and a minimum amount of return air when the temperature of the fresh air is at a predetermined value and to graduatingly decrease the amount of fresh air and to increase the amount of return air as the temperature of the fresh air rises above or falls below said predetermined value, and means responsive to the temperature of the return air also in control of the damper means controlling said return air inlet and the damper means controlling said by-pass to increase the amount of air admitted through said return air inlet and to decrease the amount of air by-passed around said cooling means as the temperature of the return air increases above a predetermined value.

4. In an air conditioning system, an air conditioning chamber having a fresh air inlet, a return air inlet, cooling means within said chamber, means for conducting air from a space being conditioned to said return air inlet, a by-pass for conducting air from said conducting means around said cooling means to said conditioning chamber, means for circulating air through said air conditioning chamber and a space to be conditioned, damper means in control of said fresh air inlet, said return air inlet and said by-pass, means responsive to the temperature of the fresh air for controlling the damper means in control of the fresh air inlet and the return air inlet to provide for admission of a maximum amount of fresh air and a minimum amount of return air when the temperature of the fresh air is at a predetermined value and to graduatingly decrease the amount of fresh air and to increase the amount of return air as the temperature of the fresh air rises above or falls below said predetermined value, means responsive to the temperature of the return air also in control of the damper means controlling said return air inlet and the damper means controlling said by-pass to increase the amount of air admitted through said return air inlet and to decrease the amount of air by-passed around said cooling means as the temperature of the return air increases above a predetermined value, and means under the control of the first mentioned temperature responsive means for controlling the cooling effect of the cooling means.

5. In an air conditioning system, an air conditioning chamber having a fresh air inlet, a return air inlet, cooling means within said chamber, means for conducting air from a space being conditioned to said return air inlet, a by-pass for conducting air from said conducting means around said cooling means to said conditioning chamber, means for circulating air through said air conditioning chamber and a space to be conditioned, damper means in control of said fresh air inlet, said return air inlet and said by-pass, means responsive to the condition of the fresh air in control of the damper means controlling said fresh air inlet and said return air inlet, means responsive to the condition of the return air also in control of the damper means controlling said return air inlet and the damper means in control of said by-pass, means responsive to the dewpoint temperature of the air leaving the cooling means, and means under the control of the first mentioned condition responsive means and the dewpoint temperature responsive means for controlling the cooling effect of the cooling means.

6. In an air conditioning system, an air conditioning chamber having a fresh air inlet, a return air inlet, cooling means within said chamber, means for controlling air from a space being conditioned to said return air inlet, a by-pass for conducting air from said conducting means around said cooling means to said conditioning chamber, means for circulating air through said air conditioning chamber and a space to be conditioned, damper means in control of said fresh air inlet, said return air inlet and said by-pass, means responsive to the temperature of the fresh air for controlling the damper means in control of the fresh air inlet and the return air inlet to provide for admission of a maximum amount of fresh air and a minimum amount of return air when the temperature of the fresh air is at a predetermined value and to gradually decrease the amount of fresh air and to increase the amount of return air as the temperature of the fresh air rises above or falls below said predetermined value, means responsive to the temperature of the return air also in control of the damper means controlling said return air inlet and the damper means controlling said by-pass to increase the amount of air admitted through said return air inlet and to decrease the amount of air by-passed around said cooling means as the temperature of the return air increases above a predetermined value, means responsive to the dewpoint temperature of the air leaving the cooling means, and means under the control of the first mentioned temperature responsive means and the last mentioned temperature responsive means for controlling the cooling effect of the cooling means.

7. In an air conditioning system, an air conditioning chamber having a fresh air inlet, a return air inlet, cooling means within said chamber, means for conducting air from a space being conditioned to said return air inlet, a by-pass for conducting air from said conducting means around said cooling means to said conditioning chamber, heating means in said air conditioning chamber, heating means in said by-pass, damper means in control of said fresh air inlet, said return air inlet and said by-pass, means responsive to the temperature of the fresh air in control of said cooling means and the damper means controlling the fresh air inlet and the return air inlet, means responsive to the temperature of the return air also in control of the damper means controlling said return air inlet, the damper means in control of said by-pass, and the heating means in said by-pass, and means responsive to the dewpoint temperature of the air leaving said cooling means also in control of said cooling means and the heating means in said air conditioning chamber.

8. In an air conditioning system, an air conditioning chamber having a fresh air inlet, a return air inlet, cooling means within said chamber, means for conducting air from a space being conditioned to said return air inlet, a by-pass for conducting air from said conducting means around said cooling means to said conditioning chamber, heating means in said air conditioning chamber, heating means in said by-pass, damper means in control of said fresh air inlet, said return air inlet and said by-pass, means responsive to the temperature of the fresh air in control of said cooling means and the damper means controlling the fresh air inlet and the return air inlet, means responsive to the temperature of the return air also in control of the damper means controlling said return air inlet, the damper means in control of said by-pass, and the heater in said by-pass, means responsive to the dewpoint temperature of the air leaving said cooling means also in control of said cooling means and the heater in said air conditioning chamber, and means responsive to the temperature of air entering the space being conditioned also in control of the heater in said by-pass.

9. In an air conditioning system, an air conditioning chamber having a fresh air inlet, a return air inlet, cooling means within said chamber, means for conducting air from a space being conditioned to said return air inlet, a by-pass for conducting air from said conducting means around said cooling means to said conditioning chamber, means for circulating air through said air conditioning chamber and a space to be conditioned, damper means in control of said fresh air inlet, said return air inlet and said by-pass, means responsive to outdoor temperature in control of the damper means controlling the fresh air inlet to open said damper means when the fresh air temperature is at a predetermined value and to move said damper means towards closed position as the fresh air temperature rises above or falls below said value, means for moving the damper means controlling the return air inlet in an opposite sense from the damper means controlling the fresh air inlet, whereby when the last named damper means are wide open, the other damper means are closed, a second temperature responsive means also in control of the damper means controlling the return air inlet, and means for moving the damper means controlling said by-pass in an opposite sense from the movement of the damper means controlling the return air inlet when the last mentioned damper means are operated by said second temperature responsive means.

10. In an air conditioning system, an air conditioning chamber having a fresh air inlet, a return air inlet, means for circulating air through said chamber and a space to be conditioned, means for spraying water in said chamber, means for recirculating said water through a cooling means, means for by-passing water around said cooling means, valve means in control of said by-passing means, means for conducting air from the space being conditioned to said return air inlet, a by-pass for conducting return air to the air conditioning chamber around said water spraying means, damper means in control of said fresh air inlet, said return air inlet and said by-pass, a first condition responsive means influenced by the heat content of the fresh air in control of the damper means controlling the fresh air inlet and the return air inlet, a second condition responsive means influenced by the heat content of the return air also in control of the damper means controlling said return air inlet and said by-pass, and means responsive to the dewpoint temperature of the air leaving said spray in control of said valve means.

11. In an air conditioning system, an air conditioning chamber having a fresh air inlet, a return air inlet, cooling means within said chamber, means for conducting air from a space being conditioned for spraying water in said chamber, means for recirculating said water through a cooling means, means for by-passing water around said cooling means, valve means in control of said by-passing means, means for conducting air from the space being conditioned to said return air inlet, a by-pass for conducting return air to the air conditioning chamber around said water spraying means, damper means in control of said fresh air inlet, said return air inlet and said by-pass, means responsive to outdoor temperature in control of the damper means controlling the fresh air inlet and the return air inlet, means responsive to return air temperature also in control of the damper means controlling said return air inlet and said by-pass, and means responsive to the dewpoint temperature of the air leaving said spray and under the control of the first temperature responsive means in control of said valve means.

12. In an air conditioning system for a space, a conditioning chamber, air conditioning means in said chamber for varying the condition of the air flowing through said chamber, means for causing air to flow through said chamber to said space, a fresh air inlet for said chamber for delivering fresh air to the air conditioning means, a return air inlet for said chamber for delivering return air from said space to said air conditioning means, a by-pass inlet for delivering air to said chamber downstream of said conditioning means, fresh air damper means for controlling the fresh air inlet, return air damper means for controlling said return air inlet, a by-pass damper for controlling said by-pass, first control means for controlling the fresh air damper means and return air damper means in unison but in opposite manners for thereby varying the proportions of fresh and return air supplied to said space while maintaining the combined air flow substantially constant, and second control means for controlling said by-pass damper means and one of said first mentioned damper means in unison but in opposite manners for changing the proportions of air passed through and by-passed around said air conditioning means without substantially varying the proportions of fresh and return air supplied to said space.

13. In an air conditioning system for a space, in combination, a first source of air for supply to a space, a second source of air, a conditioner connected for delivering conditioned air to a space, means for supplying air from said first and second sources to said conditioner, first damper means for controlling the flow of air from said first source to said conditioner, second damper means for controlling the flow of air from said second source to said conditioner, by-pass means for adding air from one of said sources to the air leaving said conditioner, by-pass damper means for controlling the flow of air through said by-pass means, first control means for controlling said first and second damper means in unison but in opposite manners for varying the proportions of fresh and return air supplied to said conditioner without substantially changing the total air flow, and second control means for controlling said by-pass damper means and one of said other damper means in unison but in opposite manners for varying the proportions of air passed through and by-passed around said conditioner without varying the proportions of air from said first and second sources which are supplied to said space.

14. In an air conditioning system for a space, a conditioning chamber, air conditioning means in said chamber for varying the condition of the air flowing through said chamber, means for causing air to flow through said chamber to said space, a fresh air inlet for said chamber for delivering fresh air to the air conditioning means, a return air inlet for said chamber for delivering return air from said space to said air conditioning means, a by-pass inlet for delivering return air to said chamber downstream of said conditioning means, fresh air damper means for controlling the fresh air inlet, return air damper means for controlling said return air inlet, a by-pass damper for controlling said by-pass, first control means for controlling the fresh air damper means and return air damper means in unison but in opposite manners for thereby varying the proportions of fresh and return air supplied to said space while maintaining the combined air flow substantially constant, and second control means for controlling said by-pass damper means and said return air damper means in unison for thereby changing the proportions of return air passed through and by-passed around said conditioning means without substantially varying the proportions of fresh and return air supplied to said space.

15. In an air conditioning system for a space, in combination, a conditioning chamber, cooling means in said chamber, means for causing air to flow through said chamber to said space, a fresh air inlet for said chamber for delivering fresh air to said cooling means, a return air inlet for said chambers for delivering return air from said space to said cooling means, a by-pass for adding return air to the air downstream of said cooling means, fresh air damper means for controlling the flow of fresh air, return air damper means for controlling the flow of return air, by-pass damper means for controlling the flow of air through said by-pass, first control means for controlling the fresh air damper means and return air damper means in unison but in opposite manners for varying the proportions of fresh and return air supplied to said space while maintaining the combined air flow substantially constant, and second control means for controlling said return air damper means and said by-pass damper means in unison but in opposite manners for varying the proportions of return air passed through and by-passed around said cooling means without substantially varying the proportions of fresh and return air supplied to said space.

16. In an air conditioning system for a space, in combination, a conditioning chamber, an air conditioning device in said chamber, a fresh air inlet for said chamber for delivering fresh air to said conditioning device, a return air inlet for said chamber for delivering return air from said space to said conditioning device, a by-pass for adding only return air to the air downstream of said conditioning device, a return air damper for controlling the flow of return air, a by-pass damper for controlling the flow of air through said by-pass, control means responsive to a condition which is a measure of the demand for conditioning by said conditioning device for controlling said return air damper and said by-pass damper in unison but in opposite manners for thereby varying the flow of air through said conditioning device, a fresh air damper for controlling the flow of fresh air, and control means for controlling said fresh air damper and one of said other air dampers in a manner to vary the proportions of fresh and return air supplied to said space.

GORDON H. GILDERSLEEVE.
ERNEST GRABER.

CERTIFICATE OF CORRECTION.

Patent No. 2,257,462.  September 30, 1941.

GORDON H. GILDERSLEEVE, ET AL.

It is hereby certified that error appears in the printed specification of the above numbered patent requiring correction as follows: Page 3, second column, line 75, strike out "65° to 75°. Thus at 65°, the arm 123 will be at" and insert the same after "example", line 71; page 9, second column, line 21, claim 6, for "controlling" read --conducting--; line 35, same claim, for "gradually" read --graduatingly--; and that the said Letters Patent should be read with this correction therein that the same may conform to the record of the case in the Patent Office.

Signed and sealed this 14th day of April, A. D. 1942.

(Seal)
Henry Van Arsdale,
Acting Commissioner of Patents.